Patented Jan. 1, 1935

1,986,720

UNITED STATES PATENT OFFICE 1,986,720

FUSED PREPARATION FOR GLASS BATCHES

Francis C. Flint, Washington, Pa., assignor to Hazel-Atlas Glass Company, Wheeling, W. Va., a corporation of West Virginia No Drawing. Application June 1, 1933, Serial No. 673,928

12 Claims. (Cl. 106—36.1)

The invention relates to the art of glass manufacture, and more particularly to a preparation which when added to an ordinary glass batch produces certain highly desirable results.

An object of the invention is to provide a new method of incorporating barium compounds with standard types of glass batches, thereby avoiding the difficulties usually encountered during the melting of barium compounds in the molten glass mass.

A further object is to combine a barium compound with another substance or substances in a separate fusion, the resulting mass having the properties, when dissolved in glass, of functioning as an oxidizer and decolorizer of a molten mass of glass and increasing the brilliance of the finished glass.

A further object is to provide a preparation which may be mixed in any desired proportion with a glass batch, and which melts and dissolves freely in the molten glass, and which aids in the reduction of the temperature required to effect a fusion of the batch, and also in purifying the molten mass as well as making the glass mass more workable.

Further objects and advantages of the invention will be apparent to those skilled in the art of glass making, from the following detailed description.

The addition of barium sulphate in varying quantities to a glass batch for producing various effects has long been known, and while the effects of barium produced in the melting of the glass and in the finished glass articles have been common knowledge for many years, yet the solution of barium sulphate directly in a molten mass of glass has been accompanied with practical difficulties which have discouraged its more general use. In accordance with the present invention these practical difficulties are overcome by treating the barium sulphate before it is used with the glass batch.

According to the present invention, barium sulphate is mixed with a readily fusible metal halide, preferably an alkali metal halide, specifically sodium chloride, in suitable proportions. The substances are first finely divided, then mixed, and fused to a quiet fusion, and the resulting mass suitably subdivided into particles which may vary in size from one-fourth inch mesh to a fine powder; a fifty mesh size has been found to be efficient. The subdivided mass is thoroughly mixed with any standard formula of glass batch, and the mixed mass delivered to a glass furnace in the usual manner. The proportions of barium sulphate and sodium chloride (or other metal halide) may vary from one-fourth of a molecular weight to about two molecular weights of barium sulphate, to about one molecular weight of the metal halide; which corresponds to from about 58 parts by weight to about 466 parts by weight of barium sulphate, and about 58 parts by weight of sodium chloride, or from 1 to 8 parts by weight of barium sulphate to one part by weight of sodium chloride. In practice, a proportion of 2 parts by weight of barium sulphate and 1 part by weight of sodium chloride has been found to be very efficient.

In making the preparation, the barium sulphate and metal halide are preferably finely divided and thoroughly mixed, and delivered to a hot crucible in small quantities, preferably additional quantities being added to the fused mass periodically. The temperature is maintained at from 800° C. to about 1500° C. (1472° F.–2732° F.), the higher temperature reducing the time required to obtain the final fusion. The reaction in the crucible between the barium sulphate and sodium chloride is exothermic, and considerable heat is evolved, but by the periodic addition of small quantities of the mixed charge to the hot crucible, the mass melts and reacts without violence and finally becomes a quiet fusion. The resulting product when cold is easily friable, and when suitably pulverized and mixed with any standard type of glass batch and melted in the glass furnace, the preparation melts and dissolves readily with the batch, much more readily than when a quantity of barium sulphate corresponding to that originally employed in the fusion is added either to the batch or to the molten glass, and without developing objectionable features often experienced when it is attempted to add barium sulphate directly to the batch. With the preparation described herein, no deleterious effects have been encountered with any of the decolorizing agents used, such as selenium, manganese, etc., and in addition, the chlorine in the preparation appears to have the property of functioning, either directly or indirectly, as a decolorizer, in that any ferrous iron is converted to the ferric state, and also some of the iron is volatilized from the molten glass as chloride fume, resulting in a clearer and more colorless glass than could have been obtained from the same batch without the addition of the preparation. This property of also functioning as a decolorizer permits the use of a reduced quantity of selenium, manganese, or other decolorizer to accomplish the same degree of decolorization, thereby contributing to a greater economy in cost of production.

The substances employed in the fusion may consist of ordinary commercial products. The barium sulphate may be barytes, also known as heavy spar, or may be a more or less purified product; the sodium chloride may be crude rock salt. It has been found that some of the iron occurring as an impurity in these products is eliminated by volatilization during the fusion. Any remaining iron is converted to the ferric condition and is decolorized in the glass furnace. Any remaining impurities in the raw materials have not been found to be objectionable. During the fusion, an interchange of acid radicles is believed to take place, with the result that when barium sulphate and sodium chloride are used, the final preparation is believed to contain barium chloride, sodium chloride, sodium sulphate, and some barium sulphate. But whatever its composition, the preparation is easily melted, and dissolves freely in the molten glass batch, the barium in the preparation performing the same beneficial functions as barium sulphate when the latter is added in the usual manner, but without causing any objectionable disturbances sometimes encountered in the old practice. The sodium sulphate present acts like salt cake, rising to the top of the molten glass and thereby reducing its effect on the decolorizer.

As noted above, other metal halides may be used in the place of sodium chloride. The halides of the alkali and alkaline earth metals of the Periodic groups 1 and 2 may be used instead of chlorine, but for reasons of economy in production, sodium chloride is preferred. The chlorine, free or combined, functions as a decolorizer and an oxidizer in the molten glass. In the place of the sodium chloride, there may be used potassium chloride, or mixed halides, for example, mixed sodium chloride and potassium chloride, or the crude mineral Carnallite, or other mixed halides with or without sodium chloride; and as additions to the sodium chloride, there may be added sodium fluoride, calcium fluoride, sodium carbonate, sodium acid sulphate, calcium carbonate, crude fluor spar, any of the boron compounds, borax, rasorite or colemanite, phosphates, soda ash or salt cake, and similar substances which have the property of reducing the temperature necessary to produce fusions of this kind.

A convenient method of disintegrating the preparation is to direct a blast of air across a stream of the molten material as it is being poured out of the crucible; this blows the molten mass into a stream of fine particles which will have a fineness of about fifty mesh, the fine particles collecting in a suitable receiver. A practical quantity of the preparation to be added to the batch, when calculated on a barium oxide content, is from about one-half per cent by weight to about eight per cent by weight in barium oxide, of the weight of the batch. With some glasses, the barium may replace a part of the calcium normally present.

As noted above, the preparation may be used with any of the standard types of glass batch, for example, window glass, bottle glass, table ware glass, etc., and it may also be used with advantage in colored glasses, such as amber glass, blue glass, etc.; such colored glasses have a greatly increased brilliance resulting from the use of the preparation.

What I claim is:

1. A preparation for a glass batch, comprising the product resulting from a fusion of a mass consisting of barium sulphate and a metal halide.

2. A preparation to be added to a glass batch, comprising the product resulting from the fusion of a mass consisting of barium sulphate and an alkali metal halide.

3. A preparation to be added to a glass batch, comprising the product resulting from the fusion of a mass consisting of barium sulphate and an alkali metal chloride.

4. A preparation to be added to a glass batch, comprising the product resulting from the fusion of a mass consisting of barium sulphate and sodium chloride.

5. A preparation to be added to a glass batch, comprising the product resulting from the fusion of a mass consisting of barium sulphate and a plurality of fusible metal halides.

6. A glass batch comprising the standard ingredients for making glass intimately mixed with a disintegrated preparation consisting of a fused product of a barium compound and a halogen compound of a metal whose oxide has an alkaline reaction.

7. A glass batch comprising the standard ingredients for making glass intimately mixed with a disintegrated preparation consisting of a fused product of a barium compound and a chlorine compound.

8. A glass batch comprising the standard ingredients for making glass intimately mixed with a disintegrated preparation consisting of a fused product of a barium compound and sodium chloride.

9. The method of incorporating a barium compound with glass, which comprises separately fusing a mass consisting of barium sulphate with a metal halide, adding the product to a glass batch, and then fusing the mass to make glass.

10. The method of incorporating a barium compound with glass, which comprises separately fusing a mass consisting of barium sulphate with mixed alkali metal halides, adding the product to a glass batch, and then fusing the mass to make glass.

11. The method of incorporating a barium compound with glass, which comprises separately fusing a mass consisting of barium sulphate with sodium chloride, finely dividing the resulting mass, mixing the finely divided substance with glass-forming materials to obtain a mixed glass batch, and then melting the mass to form glass.

12. The method of making glass, which comprises first preparing a substance by melting together a mass consisting of barium sulphate and sodium chloride until a quiet fusion is obtained, disintegrating the fused mass into a finely divided product, mixing said finely divided product with a glass batch, and melting the mixed product and glass batch in a glass furnace to make glass.

FRANCIS C. FLINT.